(12) United States Patent
Aota et al.

(10) Patent No.: US 6,866,181 B2
(45) Date of Patent: Mar. 15, 2005

(54) FRICTION STIR WELDING METHOD

(75) Inventors: Kinya Aota, Hitachi (JP); Hisanori Okamura, Tokai (JP); Kouji Sato, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 10/379,670

(22) Filed: Mar. 6, 2003

(65) Prior Publication Data
US 2004/0118899 A1 Jun. 24, 2004

(30) Foreign Application Priority Data
Dec. 20, 2002 (JP) ........................................ 2002-369160

(51) Int. Cl.$^7$ ............................ B23K 20/12; H05B 7/00
(52) U.S. Cl. ......................... 228/112.1; 228/2.1; 219/50
(58) Field of Search ................ 228/112.1, 2.1; 219/50–67

(56) References Cited

U.S. PATENT DOCUMENTS

| | | | | | |
|---|---|---|---|---|---|
| 5,460,317 | A | * | 10/1995 | Thomas et al. | .......... 228/112.1 |
| 5,829,664 | A | | 11/1998 | Spinella et al. | |
| 6,726,085 | B2 | * | 4/2004 | Litwinski et al. | ........ 228/112.1 |
| 2002/0014516 | A1 | | 2/2002 | Nelson et al. | |
| 2003/0116608 | A1 | * | 6/2003 | Litwinski | ................. 228/112.1 |
| 2003/0205565 | A1 | * | 11/2003 | Nelson et al. | .............. 219/148 |
| 2003/0218052 | A2 | * | 11/2003 | Litwinski | ................. 228/112.1 |
| 2004/0000576 | A1 | * | 1/2004 | Litwinski | ................. 228/112.1 |
| 2004/0004107 | A1 | * | 1/2004 | Litwinski | ................... 228/56.3 |
| 2004/0020970 | A1 | * | 2/2004 | Palm | ....................... 228/112.1 |
| 2004/0046003 | A1 | * | 3/2004 | Vyas | ........................ 228/112.1 |
| 2004/0050906 | A1 | * | 3/2004 | Rice et al. | ............... 228/112.1 |
| 2004/0118899 | A1 | * | 6/2004 | Aota et al. | ................ 228/112.1 |

FOREIGN PATENT DOCUMENTS

| | | |
|---|---|---|
| EP | 0 653 265 A2 | 5/1995 |
| EP | 1 151 820 A2 | 11/2001 |
| JP | A-10-225781 | 8/1988 |
| JP | 2002-239754 | 8/2002 |

* cited by examiner

Primary Examiner—Kiley S. Stoner
(74) Attorney, Agent, or Firm—Antonelli, Terry, Stout & Kraus, LLP

(57) ABSTRACT

There is provided a method capable of decreasing a friction force in friction stir welding, in which a welding tool is used. In a method of friction stir welding workpieces together by rotating and pressingly plugging a welding tool, formed from a harder material than the workpieces, into a weld zone of the workpieces and moving the welding tool relatively in a welding direction, a power supply device allows a current to flow between the welding tool 1 and the workpieces to cause resistance heating of the welding tool. Combined use of resistance heating makes it possible to decrease a friction force. Preferably, a conductive ceramic is coated on surfaces of the welding tool to cause resistance heating.

20 Claims, 5 Drawing Sheets

FRICTION STIR WELDING METHOD

BACKGROUND OF THE INVENTION

The present invention relates to a method of plugging a rotating welding tool into a weld zone of workpieces to perform friction stir welding, and a friction stir welding apparatus.

Methods of solid-state welding two workpieces without melting include a welding method making use of a friction stir phenomenon caused by rotation of a welding tool, formed from a harder material than the workpieces, by rotating and plugging the welding tool into a weld zone of the workpieces and moving the welding tool along a welding direction, such method being called friction stir welding.

Included among friction stir welding is one, in which an external heat source such as laser or the like preheats a weld zone and its neighborhood (for example, see Patent Document 1).

Patent Document 1: JP-A-10-225781 (Abstract, claim 1, FIG. 1)

In the case where temperature of a weld zone is raised only by friction heat generated between a welding tool and workpieces in friction stir welding, a very large friction force is generated in friction stir welding of thick plates or the like. When a friction force is large, workpieces become liable to be deformed, and a welding tool is shortened in life. Even when preheating is effected from outside by laser or the like, a friction force almost accounts for raising temperature of a weld zone. Therefore, a large friction force acts on a welding tool or workpieces as reaction thereof.

The invention has its object to provide a method capable of decreasing generation of a friction force in friction stir welding, and an apparatus therefor.

BRIEF SUMMARY OF THE INVENTION

According to the invention, in friction stir welding, in which a welding tool is used, resistance heating is caused on the welding tool by flowing a current between workpieces and the welding tool. Combined use of resistance heating makes it possible to suppress generation of a friction force.

In friction stir welding, since a metal is ordinarily used for a welding tool, resistance heating can be caused on the welding tool by flowing a current between workpieces and the welding tool. Preferably, however, a coating layer of a heater should be provided on surfaces of the tool so that the welding tool is made liable to cause resistance heating. A conductive ceramic can be used for the heater. Listed as a conductive ceramic applicable to the invention are Silicon Carbide (SiC), Titanium Nitride (TiN), Chromium Nitride (CrN), DLC (Diamond-like Carbon), Aluminum Nitride (AlN), Titanium Carbide (TiC), and so on, and most desirable among these materials in view of abrasion resistance, mechanical strength, toughness, and the like is Silicon Carbide or Diamond-like Carbon.

CVD, PVD, plasma PVD, thermal spraying, or the like can be applied as a method of coating a conductive ceramic. It is preferable to select a coating method depending upon a material of ceramic. CVD is desirable in coating of Silicon Carbide.

It is preferred that a coating thickness of a conductive ceramic is large since electric resistance is increased and a calorific value is increased, but coating takes much time when such thickness is large and non-coated portions are left when such thickness is small, so that such thickness in the range of 0.5 to 10 μm is generally desirable.

With friction stir welding, a welding tool comprising a small-diameter pin provided on a tip end of a large-diameter shoulder is ordinarily used, and the pin is pressed and plugged into workpieces until the shoulder comes into contact with surfaces of the workpieces. The friction stir phenomenon is actively generated specifically on a portion of the shoulder and a side portion of the pin. Accordingly, it is desirable to increase a calorific value on the shoulder and the side of the pin, and it is effective as one of measures to coat a tip end portion of the pin with a ceramic, which is higher in conductivity than a ceramic formed on the shoulder and the side of the pin. Also, with friction stir welding, the tip end portion of the pin is particularly susceptible to abrasion, and so a ceramic having an excellent abrasion resistance is preferably used for a conductive ceramic formed particularly on the tip end portion of the pin.

It is effective to coat a part of surfaces of the welding tool with an insulating ceramic and to coat the remainder of the surfaces with a conductive ceramic, and a concrete construction, function and effect in this case will be described in an embodiment described later.

In embodying the invention, it is desirable to apply a constant voltage between a welding tool and workpieces. Also, it is desirable to control voltage and current flowing through the welding tool and workpieces in a manner to make a calorific value in resistance heating constant.

A friction stir welding apparatus according to the invention is provided with a power supply device for flowing a current between a welding tool and workpieces. It is preferable to hold the welding tool with a spindle and to flow a current between the spindle and workpieces.

The invention can be applied not only to welding of aluminum or aluminum alloy and copper or copper alloy but also to welding of high melting point metals, such as carbon steel, stainless steel, titanium, or the like. It can be said that the invention provides a method, which is specifically effective in welding of this kind of materials having a high melting point. The invention is also suited to friction stir welding of thick plates.

Other objects, features and advantages of the invention will become apparent from the following description of the embodiments of the invention taken in conjunction with the accompanying drawings.

DETAILED DESCRIPTION OF THE INVENTION

Embodiment 1

Figure 1:
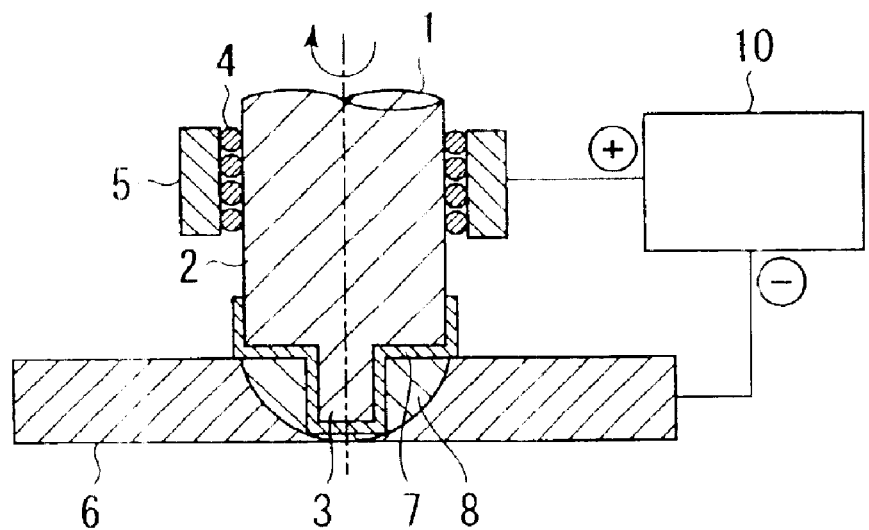
FIG. 1 is a cross sectional view showing a welding state representative of an embodiment of the invention.
Figure 2:
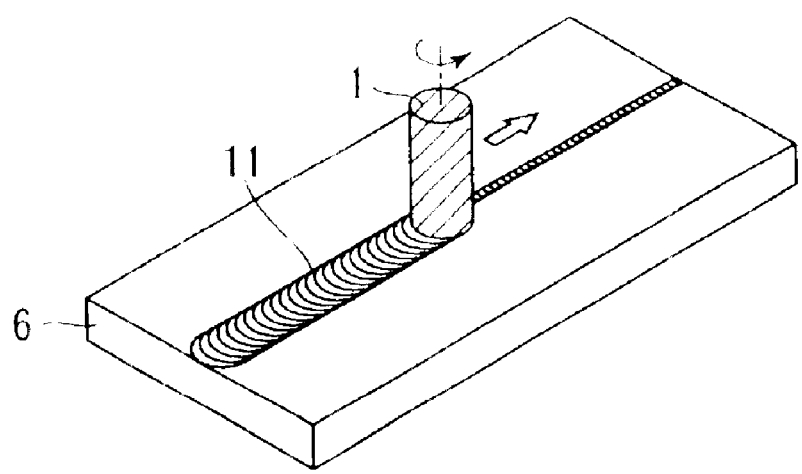
FIG. 2 is a perspective view showing a welding method according to the invention.

FIG. 1 is a cross sectional view showing a state, in which a welding tool is plugged into a welding zone of workpieces. FIG. 2 is a perspective view. However, illustration of a power supply device is omitted. A welding tool 1 comprises a large-diameter shoulder 2 and a small-diameter pin 3. The welding tool 1 is press-fitted into workpieces 6 while rotating. In this state, welding is performed by moving the welding tool 1 in a welding direction as shown in FIG. 2. The welding tool 1 is held by a bearing 4 and a spindle wall 5. Also, a power supply device 10 allows a current to flow between the spindle wall 5 and the workpieces 6.

Rotation of the welding tool 1 causes metal flow of the workpieces 6 to form a metal flow zone 8. The metal flow zone 8 may be considered to correspond to a stir zone 11 shown in FIG. 2.

A conductive ceramic 7 is coated on that surface portion of the welding tool 1, which contacts with the workpieces 6. When the power supply device 10 allows a current to flow between the spindle wall 5 and the workpieces, the conductive ceramic 7 causes resistance heating to raise temperature of a welding zone cooperating with friction heat. It is desired that a current flowing between the welding tool and the workpieces be constant in voltage. This is because the higher a welding temperature the larger a value of resistance of the conductive ceramic 7, a calorific value is the product of current and voltage, and with constant voltage, a control mechanism works such that when a value of resistance increases, a current value decreases and a calorific value itself decreases while a calorific value conversely increases when a welding temperature lowers.

In the case where it is necessary to accurately control a calorific value, it is desirable to measure current and voltage to perform welding while controlling voltage so as to obtain a predetermined calorific value. In addition, a current from the power supply device 10 may be either of direct current and alternating current. Also, with direct current, the same effect is obtained no matter whether sides of the workpieces 6 are made a positive electrode or a negative electrode.

According to the embodiment, aluminum alloy plates of JIS Standard 5052 and having a plate thickness of 5 mm were subjected to butt welding. Tool rotating speed 1 was 400 rpm, and the welding speed 1 was 600 mm/min. Tool steel was used for a material of the welding tool 1, and silicon carbide forming the conductive ceramic 7 was coated on surfaces of the welding tool by means of CVD. The conductive ceramic 7 had a film thickness of 1 $\mu$m. Instead of making the film thickness constant, temperature of the metal flow zone 8 can be controlled by thickening a surface portion of the shoulder 2, from which a large amount of friction heat is generated, and thinning a surface portion of the pin 3 to increase an amount of resistance heat generated on the surface portion of the pin 3.

In the case where voltage is applied between the welding tool 1 and the workpieces 6 to cause resistance heating of the conductive ceramic 7, it is desired that a value of resistance of the conductive ceramic 7 be larger than a value of contact resistance between the bearing 4 and the welding tool 1. This is because the bearing 4 is shortened in life when the bearing 4 causes resistance heating. In the case where it is anxious that the bearing 4 is decreased in life, it is also effective to perform welding while cooling the bearing 4 as by water cooling.

According to the invention, since a welding zone can be heated by both resistance heating and friction heat, it is possible to decrease torque, with which the welding tool 1 is rotated, and to decrease a capacity of a motor for rotating the welding tool 1.

Figure 3:
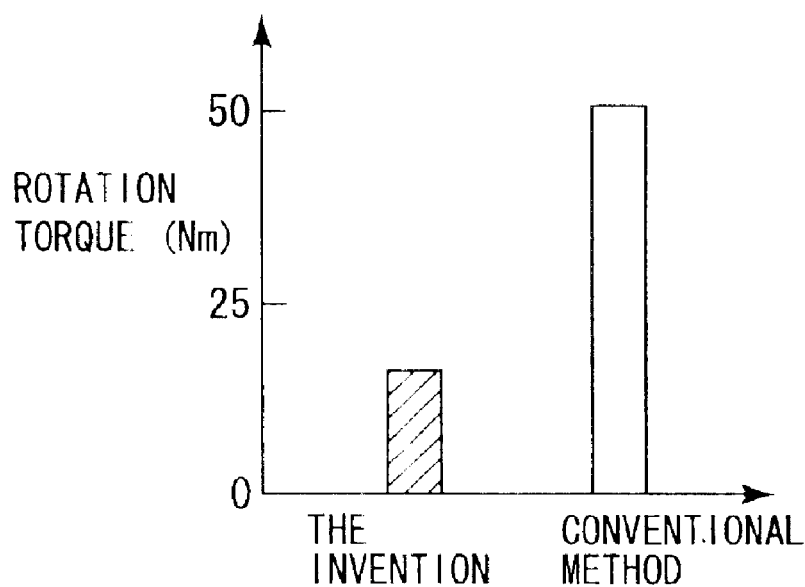
FIG. 3 is a graph indicating a comparison with respect to rotation torque of a welding tool between the invention and a conventional method.

FIG. 3 is a graph indicating a comparison with respect to rotation torque between the embodiment and a conventional method, in which a tool does not cause resistance heating. While rotation torque was as large as 50 Nm in the conventional method, rotation torque in the invention amounted to about one third of the rotation torque in the conventional method, that is, 15 Nm because the invention uses resistance heating in combination. Therefore, while a spindle motor having a rated capacity of 11 kW was needed in the conventional method, a motor having a rated capacity of 3.7 kW could accommodate the rotation torque in the invention and so it has become possible to make a motor small in size.

Figure 4:
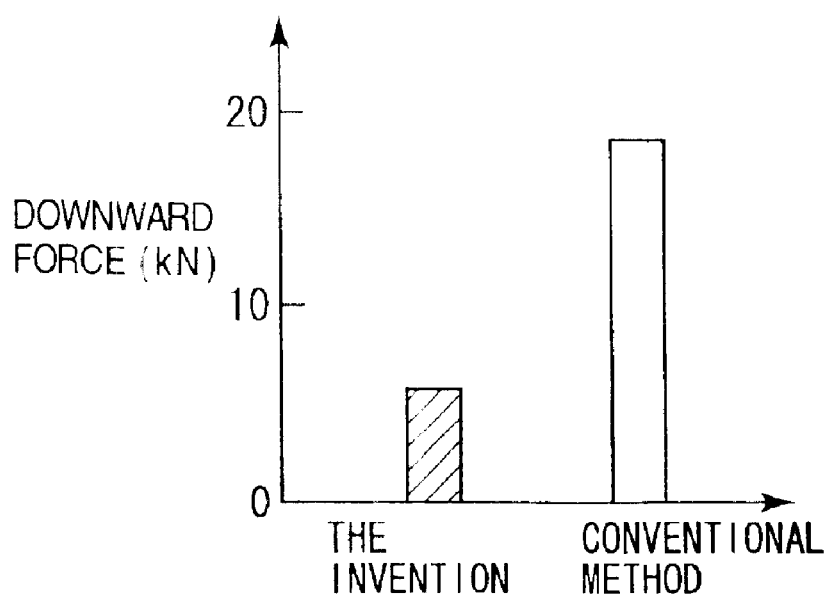
FIG. 4 is a graph indicating a comparison with respect to downward force between the embodiment and a conventional method.

FIG. 4 indicates a comparison with respect to a downward force between the method of the invention and a conventional method. Here, a downward force is a force acting in a direction along a plate thickness of the workpieces 6. While the downward force was 20 kN in the conventional method, it was as small as 5 kN in the invention. Therefore, a motor for rotating the welding tool 1 can be made small in size, and there is no need of increasing rigidity of the device, so that miniaturization and space-saving can be realized for the welding device.

Embodiment 2

Figure 5:
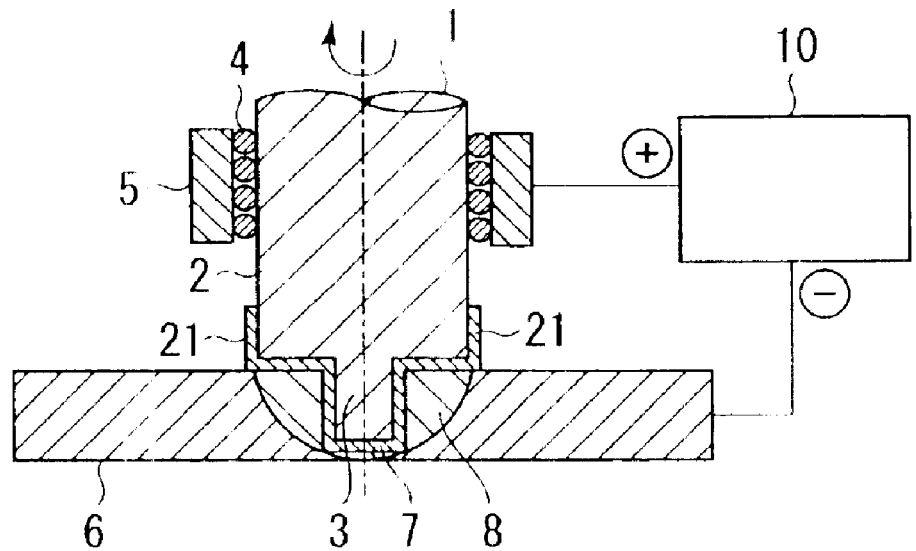
FIG. 5 is a cross sectional view showing a welding state representative of a further embodiment of the invention.

In FIG. 5, only surfaces of the pin 3 on the welding tool 1 are coated with the conductive ceramic 7, and surfaces of the shoulder 2 are coated with an insulating ceramic 21. It is desired that Sialon, Silicon Nitride ($Si_3N_4$), or the like be used for the insulating ceramic 21. Also, the insulating ceramic may be the same in thickness and coating method as the conductive ceramic. In the embodiment, heat can be selectively generated only on surfaces of the pin 3 because the insulating ceramic 21 generates no heat. Generally, resistance heating is desirably generated on the pin 3 from a point of view that temperature should be prevented from rising excessively near the shoulder 2 because friction heat is generated in a higher ratio on the surfaces of the shoulder 2 than on the surfaces of the pin 3 due to a large peripheral speed of the shoulder.

Embodiment 3

Figure 6:
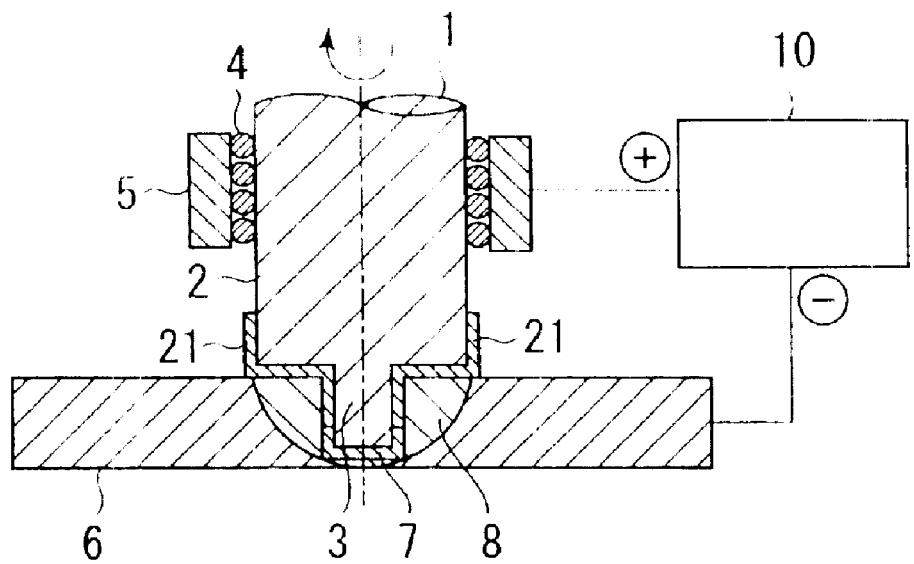
FIG. 6 is a cross sectional view showing a welding state representative of a still further embodiment of the invention.

FIG. 6 shows an embodiment, in which the insulating ceramic 21 is coated on the surfaces of the shoulder 2 and a surface of a root of the pin 3 and the conductive ceramic 7 is coated on a tip end of the pin so that only the tip end of the pin 3 causes resistance heating. According to the embodiment, it is possible to control a temperature distribution in the metal flow zone 8. While a calorific value is much generated on the surfaces of the shoulder 2, which are largest in peripheral speed, in the conventional method and so temperature becomes too high in some cases, resistance heating is caused only at the tip end of the pin 3 in the embodiment, so that the metal flow zone 8 is made uniform in temperature to enable welding with no defect even when the welding speed is increased.

Embodiment 4

Figure 7:
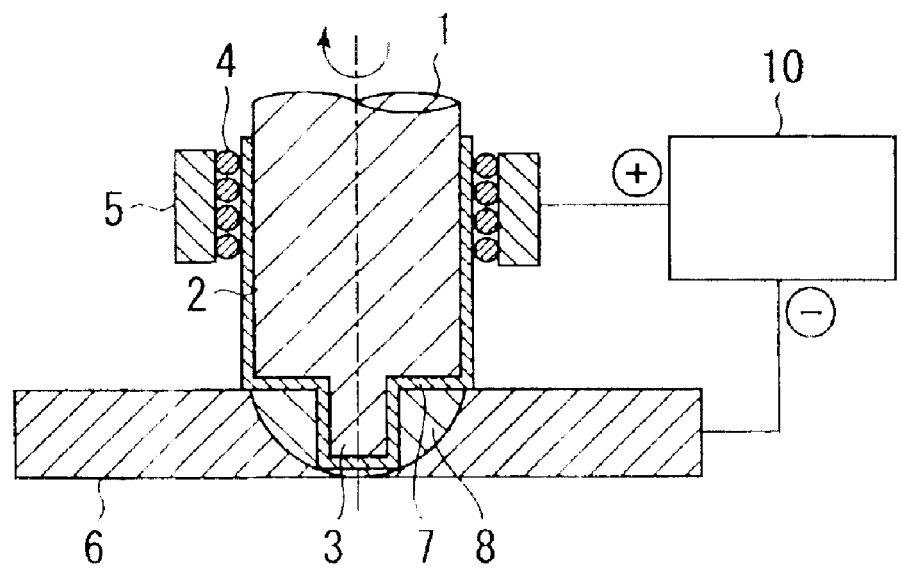
FIG. 7 is a cross sectional view showing a welding state representative of a further embodiment of the invention.

FIG. 7 shows a body of a welding tool 1 formed from an insulating ceramic, and a conductive ceramic 7 is coated on that portion of the body, which include an area in contact with a bearing 4, to allow an electric current to flow. For example, Sialon is used for the insulating ceramic. In the case where friction stir welding is to be performed on carbon steel or stainless steel, a welding tool 1 formed from tool steel is low in elevated temperature strength and so cannot be used. Thus welding is made possible by the use of ceramic such as Sialon or the like. In this case, since Sialon is an insulating ceramic, however, a current cannot be made to flow. Hereupon, a coating area of the conductive ceramic 7 is extended up to an area around the bearing 4 to allow an electric current to flow. According to the embodiment, welding can be performed on carbon steel of a high fusing point. In addition, it is desired in this case that the conductive ceramic 7 coated on surfaces of a shoulder 2 be increased to, for example, 5 to 10 μm in film thickness in order to expedite heating of the conductive ceramic in an area in contact with the workpieces 6.

Embodiment 5

Figure 8:
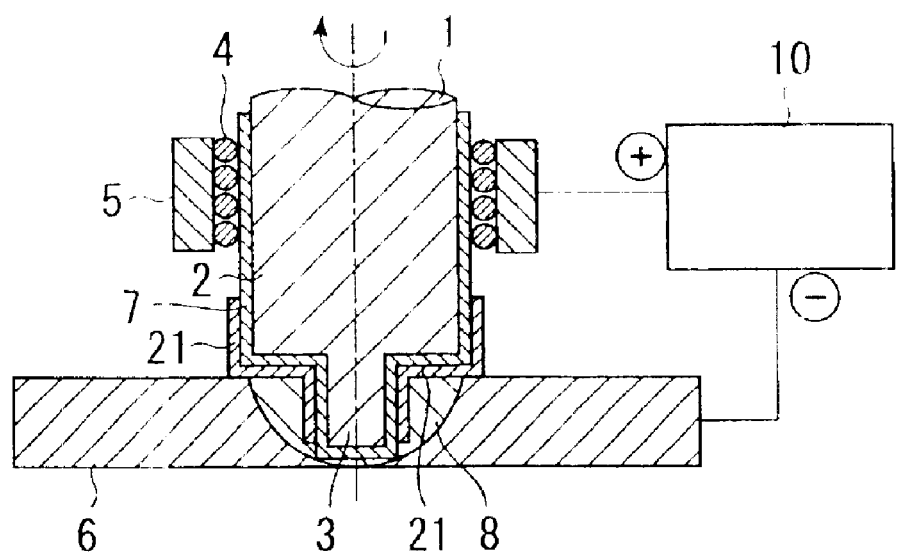
FIG. 8 is a cross sectional view showing a welding state representative of a still further embodiment of the invention.

FIG. 8 shows an insulating ceramic 21 further coated on the surfaces of the shoulder 2 and the side of the pin 3 in the Embodiment 4. In the case of welding of carbon steel, the shoulder 2 is increased in peripheral speed to be liable to involve much friction heat but it is possible according to the embodiment to prevent the surfaces of the shoulder 2 from rising excessively in welding temperature. That is, resistance heating is caused only in the vicinity of the tip end of the pin 3 whereby the number of revolutions of the welding tool 1 can be decreased as compared with conventional welding methods and so it is possible to prevent excessive heating in the vicinity of the surfaces of the shoulder 2. Thereby, even in the case of welding of carbon steel, it is possible to uniformize the metal flow zone 8 in temperature distribution to prevent generation of a defect such as deformation or the like.

Embodiment 6

Figure 9:
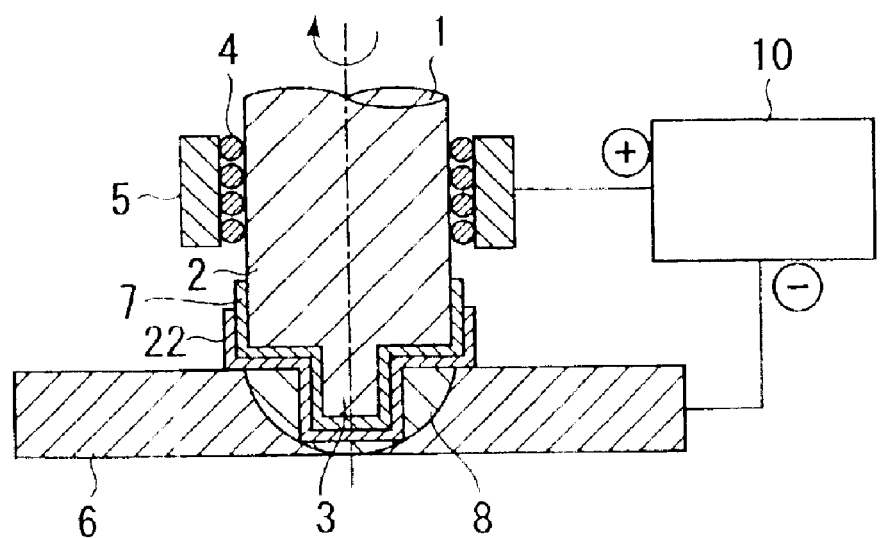
FIG. 9 is a cross sectional view showing a welding state representative of a further embodiment of the invention.

FIG. 9 shows a welding tool 1, surfaces of which are coated with a conductive ceramic 7 and an abrasion-resistant ceramic 22. It is desired that Boron Nitride or the like be used as the abrasion-resistant ceramic 22. According to the embodiment, it is possible to improve durability of the welding tool 1.

According to the invention, it has become possible to decrease generation of friction forces in friction stir welding.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of friction stir welding workpieces together by rotating and plugging a welding tool, formed from a harder material than the workpieces, into a weld zone of the workpieces and moving the welding tool relatively in a welding direction, characterized in that a current is allowed to flow between said welding tool and said workpieces to cause resistance heating of said welding tool, wherein the current allowed to flow between said welding tool and said workpieces is controlled to be made constant in voltage.

2. A method of friction stir welding workpieces together by rotating and pressing a welding tool, formed from a harder material than the workpieces, into a weld zone of the workpieces and moving the welding tool relatively in a welding direction, characterized in that a coating layer of a heater is formed on at least that portion of said welding tool, which is plugged into the workpieces, and a current is allowed to flow between said welding tool and the workpieces to cause resistance heating of said heater, wherein said heater comprises a conductive ceramic.

3. The friction stir welding method according to claim 2, wherein said conductive ceramic comprises Silicon Carbide.

4. The friction stir welding method according to claim 2, wherein said welding tool comprises a small-diameter pin on a tip end of a large-diameter shoulder, surfaces of said pin are covered with said heater, and surfaces of said shoulder are covered with an insulating ceramic.

5. The friction stir welding method according to claim 2, wherein said welding tool comprises a small-diameter pin on a tip end of a large-diameter shoulder, a tip end portion of said pin is covered with said heater, and the remainder of said pin and surfaces of said shoulder are covered with an insulating ceramic.

6. The friction stir welding method according to claim 2, wherein said welding tool is formed from an insulating ceramic and surfaces of said tool are covered with said heater.

7. The friction stir welding method according to claim 2, wherein said welding tool comprises a small-diameter pin on a tip end of a large-diameter shoulder, all surfaces of said pin and surfaces of said shoulder are covered with said heater, and further a coating layer of an insulating ceramic is formed on an outside of said heater except a tip end portion of said pin.

8. The friction stir welding method according to claim 2, wherein an outside of a coating layer formed from said conductive ceramic is further covered with a ceramic having a high conductivity.

9. The friction stir welding method according to claim 8, wherein said ceramic formed on an outermost surface of said welding tool comprises a material having a more excellent abrasion resistance than that of said conductive ceramic formed therebelow.

10. The friction stir welding method according to claim 2, wherein said welding tool comprises a small-diameter pin on a tip end of a large-diameter shoulder, materials of a ceramic, which covers a tip end portion of said pin, and of a ceramic, which covers a side portion of said pin and surfaces of said shoulder, are different from each other, and the ceramic covering the tip end portion of said pin is increased in conductivity.

11. The friction stir welding method according to claim 2, wherein the current allowed to flow between the welding tool and the workpieces is controlled to be made constant in voltage.

12. The friction stir welding method according to claim 2, wherein voltage or current is controlled so that said heater has a constant calorific value.

13. A friction stir welding apparatus for performing friction stir welding by rotating and pressing a welding tool, formed from a harder material than workpieces, into a weld zone of the workpieces and moving the welding tool relatively in a welding direction, wherein there is provided a power supply device, which allows an electric current to flow between the welding tool and the workpieces to cause resistance heating of the welding tool, wherein a coating layer of a heater is formed on at least a portion of said welding tool, which is plugged into the workpieces, and said heater causes resistance heating when an electric current is allowed to flow between said welding tool and said workpieces, and wherein said heater comprises a conductive ceramic.

14. The friction stir welding apparatus according to claim 13, wherein said welding tool is held by a spindle, and said power supply device allows an electric current to flow between said spindle and said workpieces.

15. A method of friction stir welding workpieces together by rotating and pressing a welding tool, formed from a harder material than the workpieces, into a weld zone of the workpieces and moving the welding tool relatively in a welding direction, characterized in that a coating layer of a heater is formed on at least that portion of said welding tool, which is plugged into the workpieces, and a current is allowed to flow between said welding tool and the workpieces to cause resistance heating of said heater, wherein said welding tool comprises a small-diameter pin on a tip end of a large-diameter shoulder, surfaces of said pin are covered with said heater, and surfaces of said shoulder are covered with an insulating ceramic.

16. A method of friction stir welding workpieces together by rotating and pressing a welding tool, formed from a harder material than the workpieces, into a weld zone of the workpieces and moving the welding tool relatively in a welding direction, characterized in that a coating layer of a heater is formed on at least that portion of said welding tool, which is plugged into the workpieces, and a current is allowed to flow between said welding tool and the workpieces to cause resistance heating of said heater, wherein said welding tool comprises a small-diameter pin on a tip end of a large-diameter shoulder, a tip end portion of said pin is covered with said heater, and the remainder of said pin and surfaces of said shoulder are covered with an insulating ceramic.

17. A method of friction stir welding workpieces together by rotating and pressing a welding tool, formed from a harder material than the workpieces, into a weld zone of the workpieces and moving the welding tool relatively in a welding direction, characterized in that a coating layer of a heater is formed on at least that portion of said welding tool, which is plugged into the workpieces, and a current is allowed to flow between said welding tool and the workpieces to cause resistance heating of said heater, wherein said welding tool is formed from an insulating ceramic and surfaces of said tool are covered with said heater.

18. A method of friction stir welding workpieces together by rotating and pressing a welding tool, formed from a harder material than the workpieces, into a weld zone of the workpieces and moving the welding tool relatively in a welding direction, characterized in that a coating layer of a heater is formed on at least that portion of said welding tool, which is plugged into the workpieces, and a current is allowed to flow between said welding tool and the workpieces to cause resistance heating of said heater, wherein said welding tool comprises a small-diameter pin on a tip end of a large-diameter shoulder, all surfaces of said pin and surfaces of said shoulder are covered with said heater, and further a coating layer of an insulating ceramic is formed on an outside of said heater except a tip end portion of said pin.

19. A method of friction stir welding workpieces together by rotating and pressing a welding tool, formed from a harder material than the workpieces, into a weld zone of the workpieces and moving the welding tool relatively in a welding direction, characterized in that a coating layer of a heater is formed on at least that portion of said welding tool, which is plugged into the workpieces, and a current is allowed to flow between said welding tool and the workpieces to cause resistance heating of said heater, wherein the current allowed to flow between the welding tool and the workpieces is controlled to be made constant in voltage.

20. A method of friction stir welding workpieces together by rotating and pressing a welding tool, formed from a harder material than the workpieces, into a weld zone of the workpieces and moving the welding tool relatively in a welding direction, characterized in that a coating layer of a heater is formed on at least that portion of said welding tool, which is plugged into the workpieces, and a current is allowed to flow between said welding tool and the workpieces to cause resistance heating of said heater, wherein voltage or current is controlled so that said heater has a constant calorific value.

* * * * *